United States Patent

[11] 3,573,471

| [72] | Inventor | Edwin R. Kolb<br>Cleveland, Ohio |
|---|---|---|
| [21] | Appl. No. | 608,161 |
| [22] | Filed | Jan. 9, 1967 |
| [45] | Patented | Apr. 6, 1971 |
| [73] | Assignee | Harris-Intertype Corporation<br>Cleveland, Ohio<br>Continuation-in-part of application Ser. No.<br>287,047, June 11, 1963, now Patent No.<br>3,307,172. |

[54] OPTICALLY ENCODED DISK READ OUT SYSTEM EMPLOYING OPTICAL FIBERS
1 Claim, 18 Drawing Figs.

[52] U.S. Cl. .................................................. 250/219,
250/227, 340/173, 340/347
[51] Int. Cl. .................................................. G01n 21/30
[50] Field of Search .......................................... 250/219
(IDD), 219 (ID), 219 (IDC), 227, 231, (SE);
340/347 (A—D), 347 (34/6), 347 (10), 173

[56] References Cited
UNITED STATES PATENTS

| 3,196,279 | 7/1965 | Papelian | 250/219IDDX |
| 3,281,603 | 10/1966 | Goldmark | 250/227X |
| 3,324,285 | 6/1967 | Teager | 250/219IDDX |
| 3,349,406 | 10/1967 | Perry et al. | 250/227X |
| 3,372,240 | 3/1968 | Boyers et al. | 250/227X |
| 3,327,126 | 6/1967 | Shannon et al. | 250/227X |
| 2,909,973 | 10/1959 | Koelsch, Jr. et al. | 340/173Light |
| 3,226,697 | 12/1965 | Fujitsubo | 340/173Light |

*Primary Examiner*—James W. Lawrence
*Assistant Examiner*—C. M. Leedom
*Attorney*—Young and Tarolli ABSTRACT: Binary data optically recorded in circular tracks on a rotating member is converted into electrical signals by illuminating a limited area on the member, magnifying the image of the illuminated area and projecting that image onto a fiber optic assembly having optical fibers for each track on the member which route the light information to photoelectric transducers and convert the light information into electrical signals. Both optical and mechanical magnifying means are used to permit high density radial and circumferential packing of the binary data while permitting the use of relatively large but highly sensitive photoelectric transducers.

Patented April 6, 1971

INVENTOR
EDWIN R. KOLB
BY
Marechal, Biebel, French & Bugg
ATTORNEYS

Patented April 6, 1971  3,573,471

Patented April 6, 1971 3,573,471

ENCODER READOUT PHOTOMULTIPLIER AMPLIFIER & SCHMITT TRIGGER CIRCUIT

2 INPUT NOR GATE DRIVE

R-S MEMORY WITH "AND" GATE INPUT

OPTICALLY ENCODED DISK READ OUT SYSTEM EMPLOYING OPTICAL FIBERS

RELATED APPLICATION

This application is a continuation-in-part of Ser. No. 287,047 filed Jun. 11, 1963, now U.S. Pat. No. 3,307,172 issued Feb. 28, 1967 for ENCODER METHOD AND APPARATUS.

SUMMARY OF THE INVENTION

This invention relates to an apparatus for recovering high density binary or digital information optically recorded on a photographically prepared member.

A method and apparatus for placing binary marks on a photographic disc is described in copending parent U.S. application, Ser. No. 287,047, cited above, wherein digital or binary marks are stored on discrete tracks radially spaced on a rotatable transparent member. The binary data is preferably arranged in angularly spaced relation with a maximum packing density limited only by the resolution of the optical elements employed, by the photographic materials used in combination with the disc, and to the degree to which mechanical errors in making disc can be held to a minimum. While a rotatable disc is described in said copending application, it is understood that other recording and storage members may be used to record the binary data to be subsequently read out by the invention described herein, such other recording members including, but not limited to, drums or tapes onto which is recorded optically the digital or binary marks in accordance with the teachings of said copending application.

The storage disc may have binary information stored thereon in a plurality of tracks extending circumferentially thereabout with each track spaced radially from adjacent tracks. In one form of encoded disc, approximately 35 tracks are radially grouped together to form a band, and several bands are included on the disc. Since the digital information is both radially and circumferentially packed, high density storage of the digital information is therefore possible.

In one form of the invention, the light source consists of a tungsten bulb having a linear filament and optical means focusing the image of the filament onto the disc. The image of the illuminated area is filament focused by other optical means onto a plurality of optical fibers, with each fiber receiving the binary information recorded on one of the tracks of the disc. Another form of the invention employs a light source which floods all or selected limited areas of the disc with light. A mask is provided to cover the optical fibers to allow only a portion of the total width of a single binary bit to be applied to the fibers. The optical fibers transmit this information to a set of photoelectric transducers, such as photomultiplier tubes, where the optically recorded data is translated into electrical signals. It is contemplated in this invention that a single photoelectric transducer is to be used with each track within a band but the same photoelectric transducers may be used with tracks in other bands.

The high density binary data may be read by highly sensitive photoelectric transducers situated at a location remote from the optically encoded member by first of all optically magnifying the portion of the track illuminated by the light source, applying the magnified image to the ends of a set of optical fibers, and then separating the fibers a distance sufficient to accommodate the photoelectric transducers. In this way, the size of the photoelectric transducers and their relative placement is practically immaterial to the density of the data stored on the optical member since the intensity of the light received by the optical fibers is not diminished by merely separating the optical fibers. With prior art devices, however, magnifying the area illuminated by the light source and applying this image directly to photoelectric transducers inherently limits the amount of magnification which may be accomplished and restricts the intensity of the light which may be applied to each photoelectric transducer.

In one use of an optically encoded member, information is recorded representing alphanumeric characters for use in phototypesetting systems employing cathode ray tubes where the alphanumeric characters are displayed sequentially in response to the output of a computer or of a control record. In these installations, as well as where the encoded disc is used to translate data from one system of representation to another, it is highly desirable to provide high density storage to reduce the size of the storage element. In the case of a rotating disc, the size of the disc and speed of rotation is limited by the centrifugal forces produced. For practical readout rates, it is therefore necessary not only to provide high density packing circumferentially of the disc, but also to provide for high density packing radially.

Accordingly, it is an object of this invention to provide a fiber optic readout of a multitrack high density disc.

A further object of this invention is the provision of an encoded disc and method including a synchronizing track for unambiguous readout of a binary code.

Other objects of this invention are to provide a fiber optic readout assembly allowing the optical information stored on an encoded disc to be transmitted to a remote location and be applied to photoelectric transducers, such as photomultiplier tubes, and converted into electrical signals; to provide a fiber optic readout assembly permitting high density radial and circumferential packing of digital information on an optically encoded member; and to provide an apparatus for reading out an encoded member which includes means to illuminate a portion of said member, optical means to magnify the area so illuminated and focus that image on a plurality of optical fibers, each of said fibers being aligned so that the light from a single track on the disc coincides with corresponding discrete fibers, and means to transmit the light received by said fibers to a remote location and be applied to photoelectric transducers having a size which would prevent their receiving the light image directly from said optically encoded member.

Other objects and advantages of the invention will be apparent from the following description, the accompanying drawings and the appended claims.

DESCRIPTION OF THE PREFERRED EMBODIMENT

Figure 1:
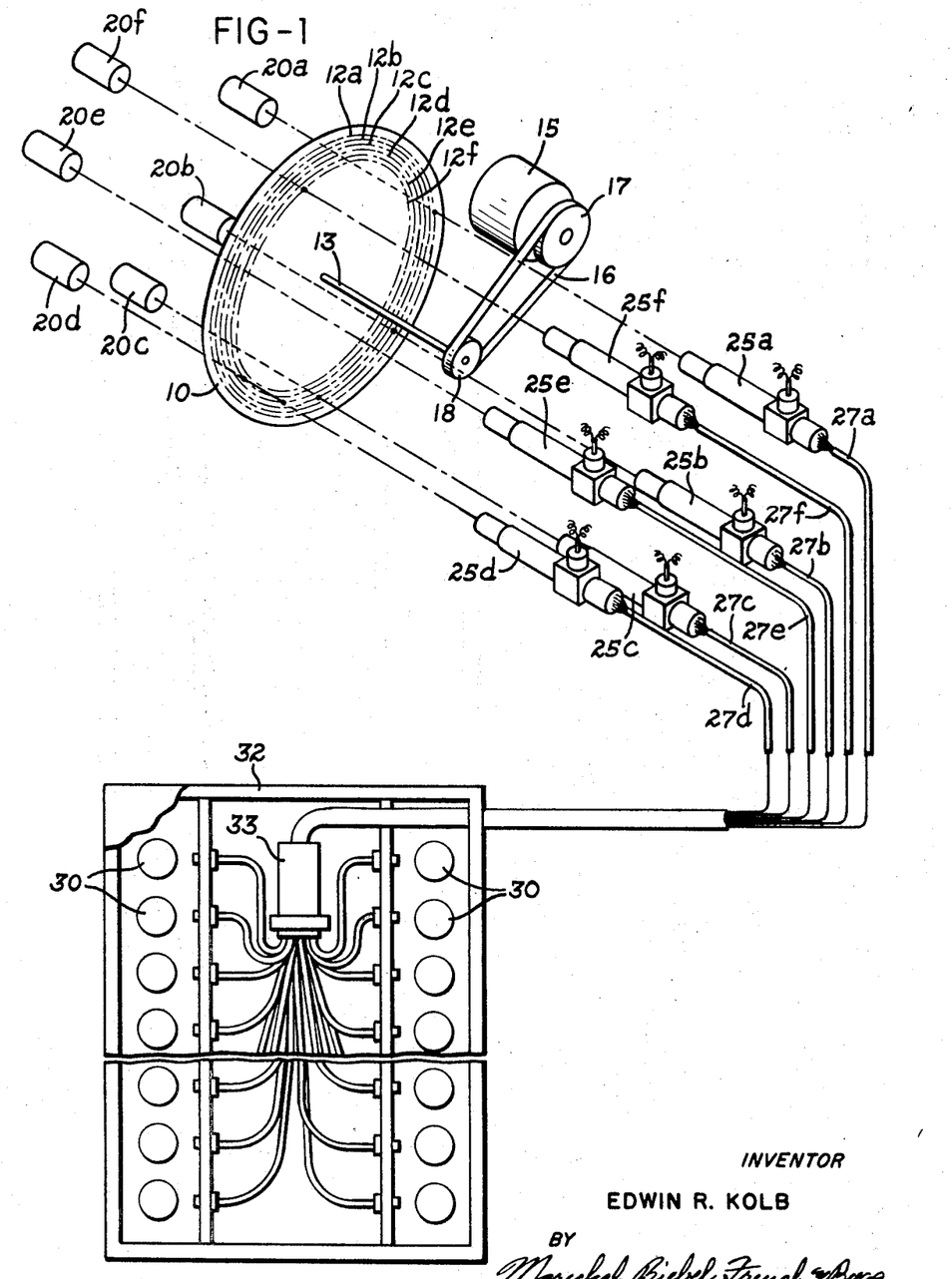
FIG. 1 is a schematic view showing an optically encoded member having a plurality of light sources arranged to illuminate selected portions of the member and having means to receive the image of the illuminated portions and to transmit that image to corresponding, remotely located photoelectric transducers.

Referring now to the drawings and particularly to FIG. 1 which diagrammatically illustrates the apparatus for reading out information optically recorded on a permanent, transparent memory, the memory is designated 10 and has a plurality of bands 12a—12f radially spaced and circumferentially extending therearound. While the bands are shown in FIG. 1 as single lines, it is understood that each of these bands actually contain a plurality of individual tracks, and in the preferred embodiment described herein six bands are placed on a single rotatable member or disc 10 with each band containing 35 tracks.

Each of the bands 12a through 12f on the disc are illuminated by corresponding light sources 20a through 20f. These light sources focus a radially extending narrow beam of light to illuminate only a corresponding band 12 on the member 10. In one embodiment of this invention, the light source extends across 35 tracks in a radial direction, but has a width approximately one-half the width of the marks photographically recorded on the member.

The optically encoded member or memory 10 may be formed from a relatively thick transparent glass plate with one surface coated with a photographic emulsion and which has recorded thereon by a photographic means the digital or binary marks which may be later read out and converted to electrical signals. The member 10 is rotated about its axis 13 by a suitable drive means such as electric motor 15. A belt 16 extends around a pulley 17 on the motor, and rotates the pulley attached to the member 10. The diameter of the member, and therefore the radial spacing of the tracks within the bands themselves, is therefore restricted by the centrifugal force developed when the disc is rotated at high speeds. Accordingly, with the speed of rotation thus limited, it is desirable to have the information recorded thereon packed as tightly as possible to provide the high readout rates required to make such a memory useful. The optically encoded member or memory 10 may be the same as the disc shown in copending U.S. application, Ser. No. 287,047, cited above, or the memory may be the type used to store the digital representation of alphanumeric characters for use in phototypesetting systems employing cathode ray tubes. In either case, high density packing, both radially and circumferentially, is desirable.

The image illuminated by the lamps 20 is then received by the pickup means 25a through 25f and transmitted by fiber optic cables 27a through 27f to the photoelectric transducers 30. While the image pickup means 25 is shown on the side of the member 10 opposite from the light source 20, it is understood that the pickup means 25 could be positioned on either side of the member 10 and therefore receive either transmitted or reflected light from the tracks.

The photoelectric transducers or photomultipliers 30 are contained within a lighttight housing 32 and each receives a fiber optic cable from corresponding tracks within each of the bands 12a through 12f. Thus, in the preferred embodiment of the invention, 35 photomultipliers, are employed, one for each track within a band, and each photomultiplier receives the image from a single track in each of the six different bands. Suitable holders 33 support the individual fibers so that the light emitting from the polished ends is applied to the respective cathodes of the photomultipliers. In this manner, highly sensitive and high speed photoelectric transducers, which have bulk and size, may be used for reading out an encoded disc by the use of single fiber elements responsive to the projected image of the data represented by each track.

Figures 2, 3:
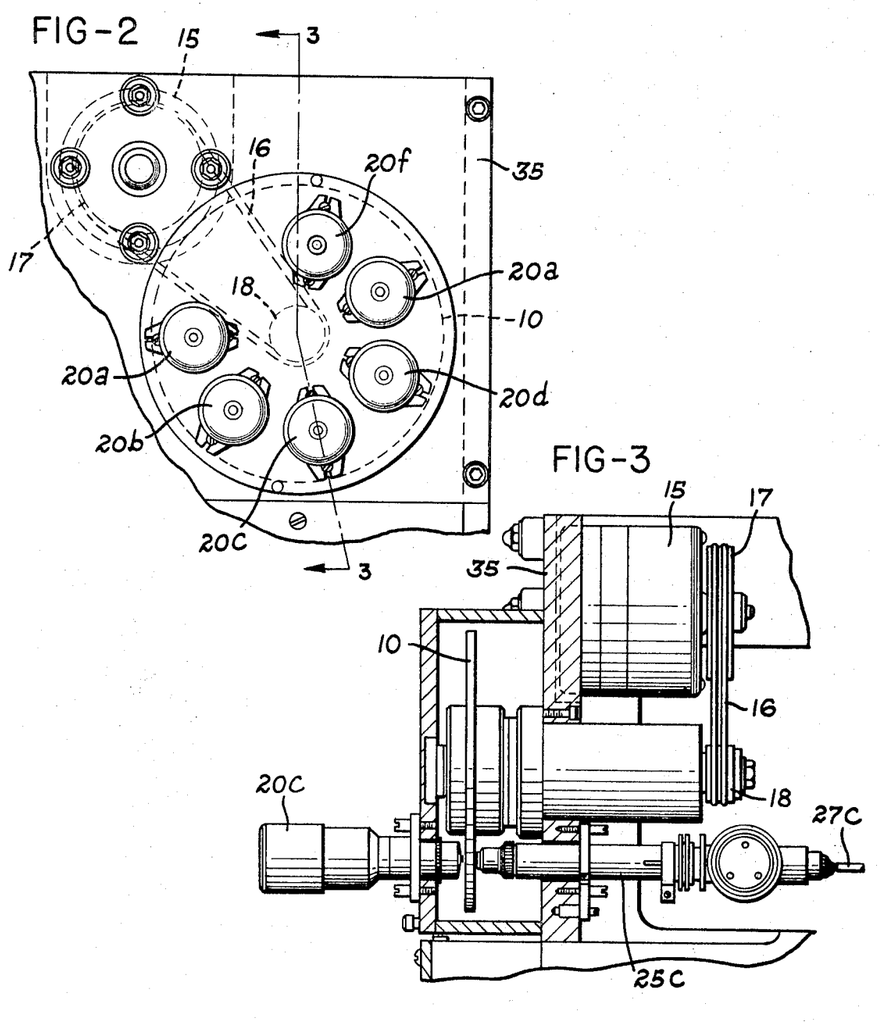
FIG. 2 is an end view of a preferred embodiment of the invention showing the relationship of the light sources to an optically encoded member and the means for rotating that member.
FIG. 3 is a view partly in section taken along the line 3—3 of FIG. 2.

The light sources 20a through 20f shown in FIG. 1 each illuminate different bands on the optical member 10. Since the light source assemblies are much larger than the areas illuminated, they are arranged circumferentially about the member 10. The light sources 20a through 20f shown in FIG. 2 are mounted to the frame member 35 with each positioned a different radial distance from the axis of rotation of the member 10. The light source is spaced only a small distance from member 10, as shown in FIG. 3, to illuminate only a small area thereof.

Figure 4:
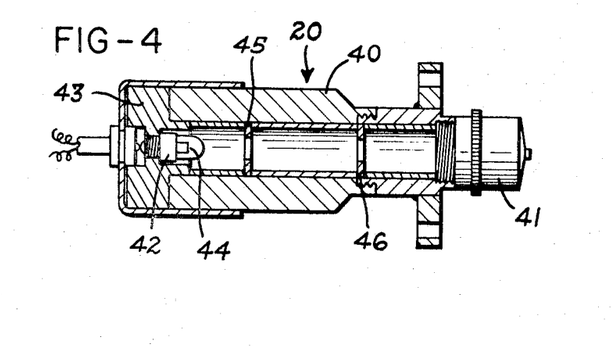
FIG. 4 is a detailed sectional view of one light source for illuminating the optically encoded member.

Details of one form of light source are show in FIG. 4. The tubular body 40 of the light source is provided with a projecting lens 41 mounted at one end and a tungsten filament lamp 42 removably mounted in a holder 43. The lens 41 consists of a microscope objective arranged to project a microluminous image of the lamp filament 44 onto the emulsion surface of the member 10. The filament of the lamp is linear and of a smaller diameter, such as 0.0015 inch to produce a luminous image which forms a small part of the width of the smallest bit or mark optically recorded on the member 10, but which has a radial dimension sufficient to illuminate several tracks. The lamp 42 may be rotated in the holder 43 to position the filament 44 radially of the member 10. Light baffles 45 and 46 are positioned in the tube 40 intermediate the lamp 42 and the lens 41.

Referring again to FIGS. 2 and 3, the motor 15 is shown securely mounted to the housing 35. A belt 16 is reeved about pulley 17 to rotate the pulley 18 journaled in housing 35 and which has attached thereto the optically encoded member 10. In FIG. 3, only one light source and light-receiving means is shown for the purpose of clarity. It is also understood that more than one optically encoded member could be rotatably mounted on the housing 35 and driven by a single motor 15.

The light-receiving or pickup means 25c is shown in FIG. 3 as being adjustably mounted on the housing 35 in order to focus accurately the image of the illuminated area on the plate 10 onto the fiber optic means for transmission to the photoelectric transducers. This adjustably mounted member is more clearly shown in FIGS. 5 and 6 and comprise a plate 50 secured to the tube 51 which supports the light pickup means. The plate 50 is mounted to move radially of the member 10 and is provided with a first radially extending slot 52 at its end portion and a second radially extending slot 53 at an intermediate position. The plate 50 is secured to the housing 35 by screws 54 and 55 which extend through the slots 52 and 53, respectively, thus allowing the plate, along with the light pickup assembly, to be moved radially of the member 10. To facilitate small radial movements and to align properly the fiber optic pickup assembly, an eccentrically mounted shaft 56 extends through a third slot 57 in the plate 50. Therefore, after loosening the screws 54 and 55, the pickup means 25 may be moved radially merely by rotating the eccentrically mounted shaft 56, and when properly positioned, locked in place by tightening screws 54 and 55.

Figure 5:
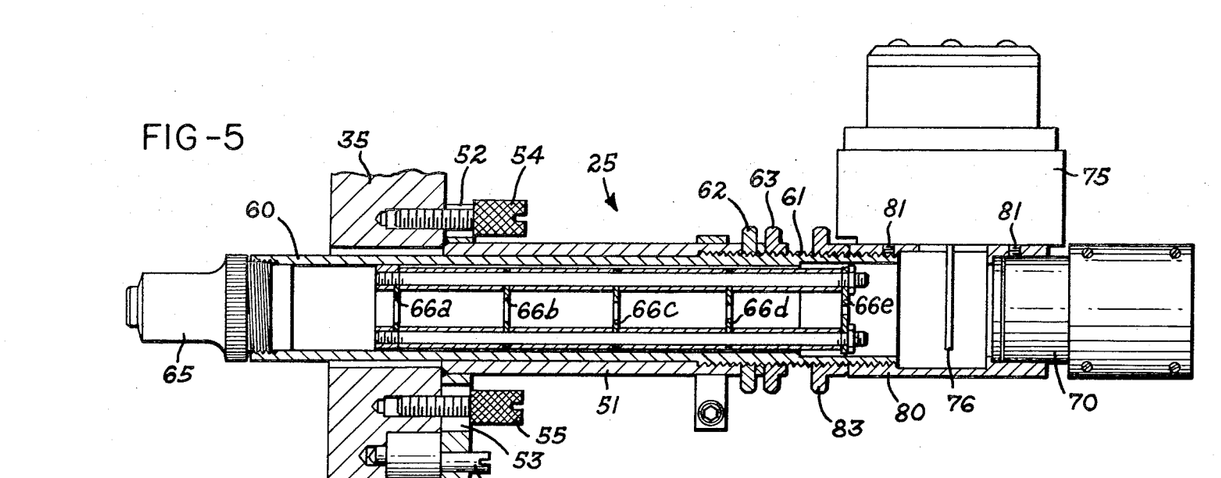
FIG. 5 is a detailed view partly in section of a light pickup means receiving the image from the optically encoded member and focusing this image onto a set of optical fibers.
Figure 6:
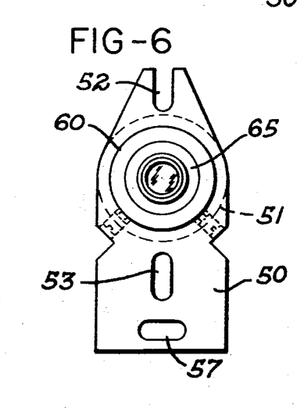
FIG. 6 is an end view showing an adjustment plate for aligning the light pickup means to receive the illuminated image from the optically encoded member.

The light-receiving or pickup means shown in FIG. 5 includes a supporting tube 51 in which is positioned a second tube 60 provided with threads at its rearward portion, as at 61, and which is threaded into the tube 51. A pair of locking nuts 62 and 63 securely hold the tube 60 within the tube 51. A microscope objective lens 65 is threaded into the forward end of the tube 60 and focuses the image from the emulsion surface of the member 10 onto a fiber optic light-receiving assembly through a series of baffles 66a through 66e. These baffles 66 are mounted within the tube 60 to restrict the amount of unwanted light which may be picked up by the lens 65, and are elongated in the radial direction to allow the entire radial extent of the image to be applied to the fiber optic light-receiving assembly 70. A shutter mechanism 75 having a shutter plate 76 positioned intermediate the lens 65 and the fiber optic assembly 70 normally interrupts the light from the member 10.

Figure 7:
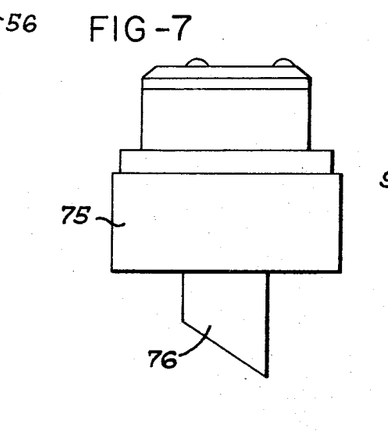
FIG. 7 is an end view of a shutter mechanism used to interrupt the image focused on the fiber optic means.

As shown in FIG. 7, the shutter plate 76 is cut at an angle which corresponds to the radial direction of the image formed on the disc 10 and is mounted on a coil similar to the voice coil of a loudspeaker. A magnet is contained within the shutter mechanism 75 and will attract the shutter plate 76 upwardly when current is passed through the coil supporting the plate. Thus, in the preferred embodiment of the invention, all of the light source assemblies 20a through 20f remain on and selection of all the tracks in a single band is accomplished by energizing only one shutter assembly at a time. In this manner, a single set of photoelectric transducers may be used to accommodate several bands of information on the member 10.

The shutter mechanism 75 is mounted to the block 80 by screws 81. The block 80 is in turn screwed onto the tube 60 and locked in place by the lock nut 83. The fiber optic assembly 70 is placed in position in the block 80 and secured therein by other locking or fastening means, not shown. This arrangement permits the rotation of the fiber optic assembly 70 to align the optical fibers with the image focused thereon from the member 10. Focusing and sizing may be accomplished both by relative lateral movement of the block 80 with respect to the tube 60, as well as by the positioning of the fiber optic assembly 70 with the block 80, and by the positioning of the lens 65 with respect to the tube 60.

Figure 8:
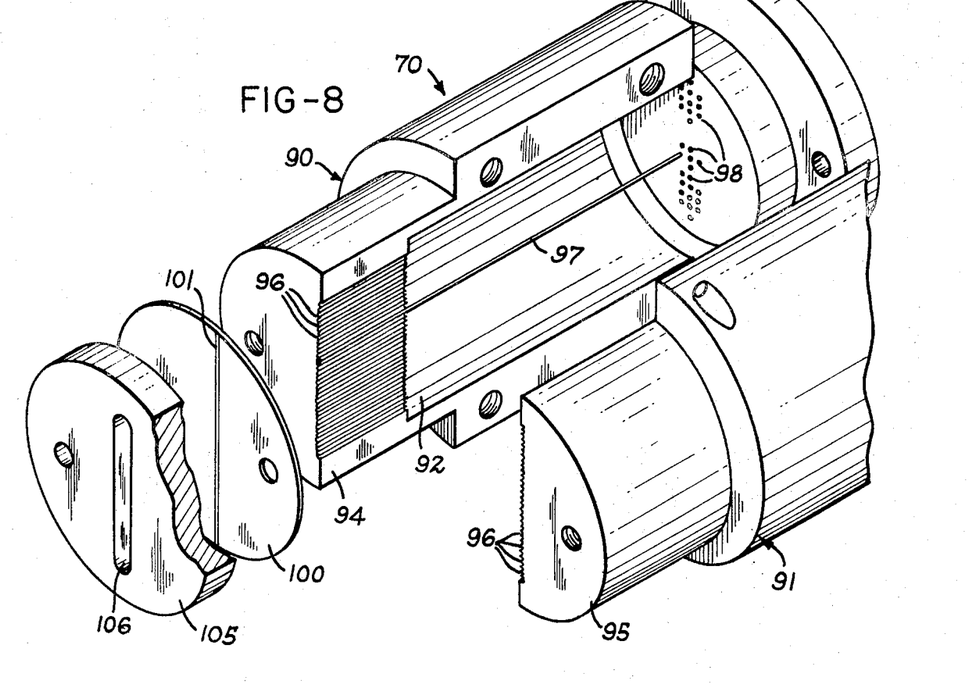
FIG. 8 is a perspective view of a preferred embodiment of the fiber optic assembly.

Referring now to the preferred embodiment of the fiber optic assembly 70 shown in the perspective view of FIG. 8, the assembly 70 comprises two semicircular shaped members 90 and 91, each having hollow portions 92 and solid portions 94, 95. Within the solid portions 94 and 95 are cut slots 96, the number of which is equal to the number of tracks within a single band on the optically encoded member 10. The slots 96 in this embodiment are semicircular in each of the members 90 and 91 and having a diameter sufficient to accommodate a single, fairly large diameter optical fiber. By way of illustration, the spacing between centers of the slots 96 is 0.022 inch while the slot diameter is in the order of 0.020 inch. An optical fiber 97 is laid into the slot with its forward end extending beyond the end of portion 94 and having its other end terminated in one of the holes 98 in the end plate 99. After all of the fibers 97 have been laid into the respective slots 96, the end plate 99 and the members 90 and 91 are moved together and the entire assembly locked into position by screws or other fastening means. The optical fibers 97 are then cut and polished flush with the external surface of the end of portions 94 and 95. The interior of the portions 92 and 93 may be filled with epoxy further to assist in maintaining the spacing and rigidity of the optical fibers 97.

Figures 9, 10:
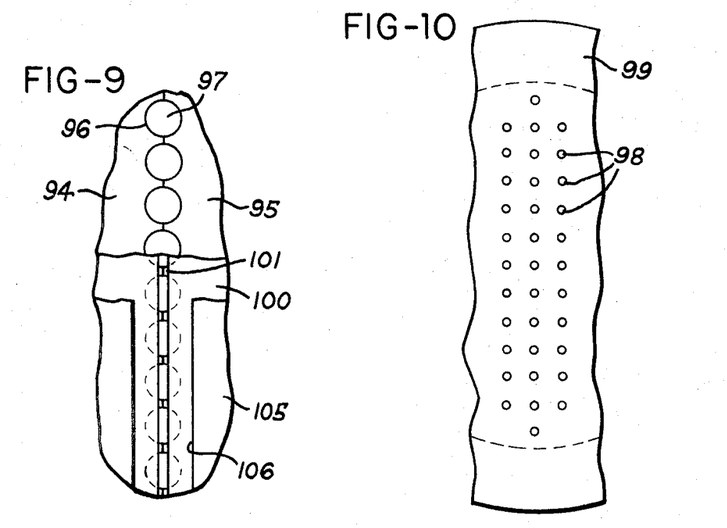
FIG. 9 is a view of an image-receiving portion of the fiber optic assembly shown in FIG. 8, with the shield and slit-forming members partially broken away.
FIG. 10 is a partial end view of the fiber optic assembly shown in FIG. 8.

A mask 100 is laid over the light-receiving end portions of the optical fibers 97 and is provided with a transparent portion 101 in order that the optical fibers receive only a portion of the image from the member 10 and thereby insure that high resolution readout of the image is obtained. When using such a mask, the entire disc may be flooded with light either by using a plurality of individual light sources, or a single large light source. In the embodiment described, the transparent portion 101 is 0.004-inch wide. As A shield 105 having a slot 106 cut through its central portion and aligned with both the transparent portion 101 and with the optical fibers secures the mask 100 in place against the solid portions 94 and 95, as by screws or other fastening means.

Figure 11:
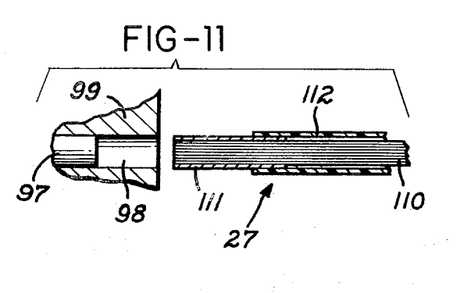
FIG. 11 is a detail of a fiber optic cable which transmits the light from the fiber optic assembly shown in FIG. 8 to the photoelectric transducers.

As shown in FIG. 11, the optical fiber 97 extends only part way into the hole 98 formed in the end member 99. The light from this single, fairly large optical fiber 97 may then be transferred to a flexible optical cable 27 and then transmitted to the photoelectric transducers. The cable 27 shown in FIG. 11 consists of approximately 31 smaller optical fibers in a bundle 110 having a metallic sleeve 111 at one end, the outside diameter of which is approximately the same as the diameter of the hole 98 into which it may be received and there abut the optical fiber 97. The remainder of the bundle 110 may be covered with a plastic sheath 112 formed from a heat-shrinkable polyvinylchloride tube. It is well understood that a plurality of smaller fibers enables the cable 27 to be flexible and minimizes the reduction in light intensity transmitted therethrough should a few of the optical fibers become broken.

By way of example, in one operating unit of the type described, the discrete tracks within a band 12 on the member 10 are on 0.002 inch centers and the circumferential width of a single bit of information within any one of the tracks is less than approximately 0.001 inch. The image of the tracks within the band is magnified approximately 11 times by the lens 65 and that image is projected onto the optical fibers in the assembly 70. Therefore, the magnified image of the tracks are spaced approximately 0.022 inch apart, while the width of a single bit of data within a single track now occupies 0.011 inch. Since the transparent portion 101 in the mask 100 is only 0.004 inch, only a small portion of the total width of a single binary mark is permitted to be applied to the optical fibers.

As shown in FIGS. 8 and 10, the optical fibers 97 which were arranged radially at the forward end of the assembly 70 are separated in the end member 99. The optical cables 27a then transmit the light to photoelectric transducers which are spaced apart by several inches. Thus, the discrete tracks on the disc which are spaced apart by approximately 0.002 inch may be read by photoelectric transducers which are separated by several inches through the use of optical magnifying means and by fiber optic elements which separate the image without appreciable loss of light intensity.

Figure 12:
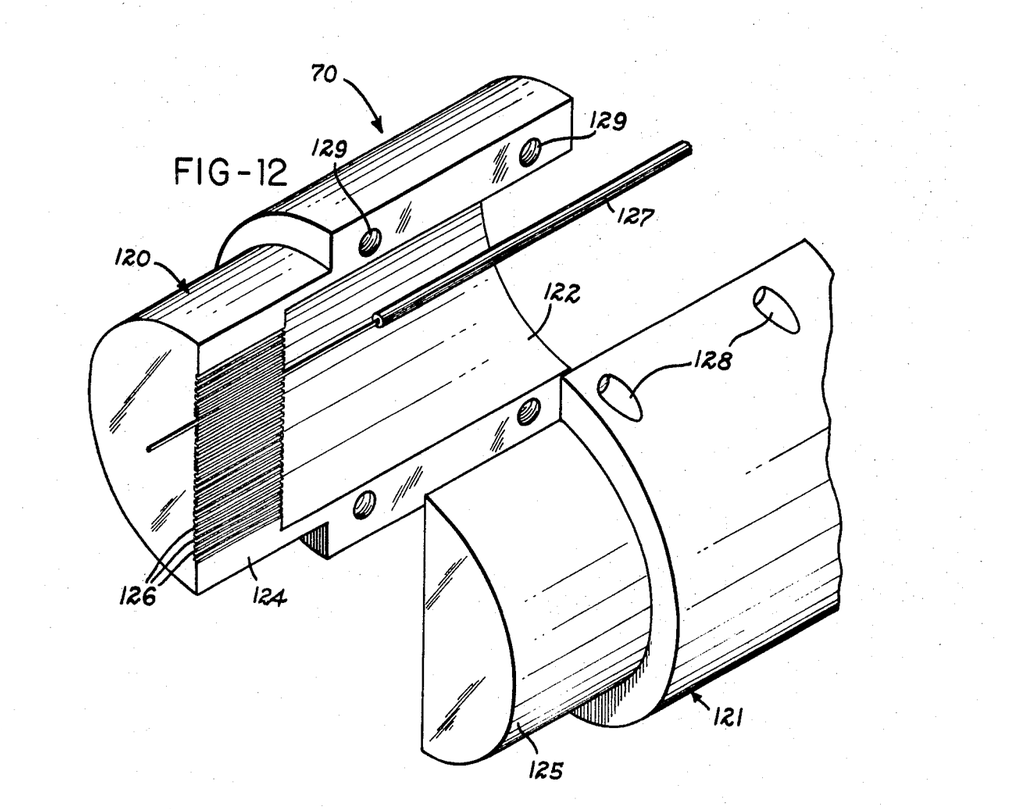
FIG. 12 is a perspective view of another embodiment of the fiber optic pickup means constructed according to this invention.

Another embodiment of the fiber optic assembly 70 is shown in FIG. 12 where the assembly consists of two members 120 and 121, each having hollow portions 122 and solid portions of reduced diameter 124 and 125 adapted to be received into the block 80 shown in FIG. 5. Within the solid portion 124 are cut rectangular slots 126, the number of which is equal to the number of tracks within one band on the optically encoded member 10. The distance between the slots may be in the order of 0.020 inch while the slot depth is in the order of 0.003 inch.

Figure 13:
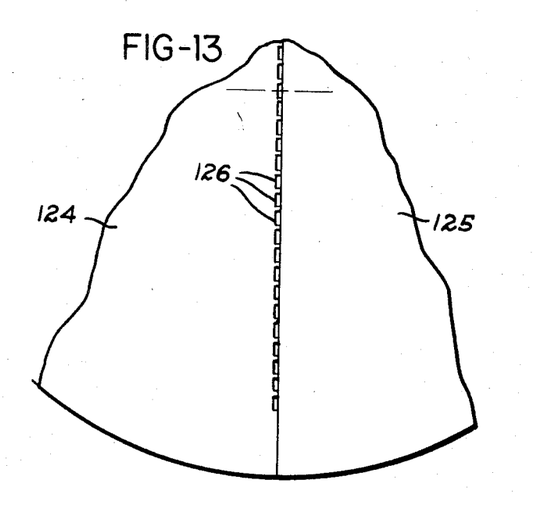
FIG. 13 is a view of the fiber optic light-receiving members shown in FIG. 12.
Figure 14:
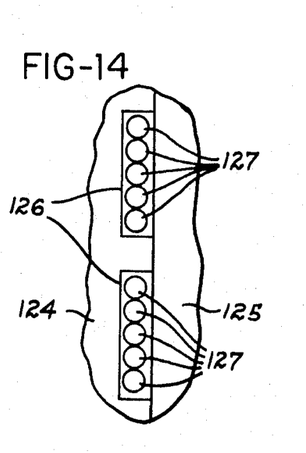
FIG. 14 is a detailed view of a portion of FIG. 13, showing two fiber optic image-receiving members.

As shown in detail in FIG. 13, and in further enlarged detail in FIG. 14, the slots 126 are cut into only the portion 124 and are rectangular in shape. The slots receive five fiber optic filaments, each filament having a diameter of approximately 0.003 inch. Therefore, to accommodate these fibers the slot length is approximately 0.017 inch. Each slot therefore receives the image from a single track with a total of five filaments within a single bundle carrying the light data to the photoelectric transducers.

Referring again to FIG. 12, a bundle of five filaments comprises a fiber optic cable 127 which is routed to the photoelectric transducers and is covered with a polyvinylchloride tube. By providing a plurality of smaller fibers, flexibility is obtained in the cable and the cable may then be directly routed to the photoelectric transducers. Therefore, if one or more of the individual filaments within the bundle become broken, the intensity of light applied to the cathodes of the photoelectric transducers would be attenuated, but not completely eliminated.

Once each of the fiber optic cables 127 is laid in place with the five filaments comprising each cable laid side-by-side in the slot 126, as shown in FIG. 14, the mating member 121 is installed in place by fastening means such as screws passing through the openings 128 and into the threaded holes 129. The hollow interior 122 of the assembly 70 may be filled with epoxy to prevent unnecessary relative movement between the filaments and further to secure the fiber optic cables in their place. The ends of the cable are then cut flush with the end of portions 124 and 125 and ground and polished to received light from the encoded member.

When used with the optically encoded disc described in copending application, Ser. No. 287,047, the output of each of the photomultiplier tubes receiving the light from the disc is amplified and direct current coupled to a Schmitt trigger circuit, as illustrated in the block diagram of FIG. 15, and the schematic diagram of FIG. 16. By taking the output of either plate resistor of the Schmitt trigger, indicated as A or $\bar{A}$, a signal is available (e.g., of about −10 volts in the example) for either a clear or opaque area in the disc.

The invention also includes provisions for an unambiguous readout, and for this purpose any desired type of code information can be placed in all but one of the tracks within a band, while the remaining track will have alternate clear and opaque areas corresponding to every possible position of a code on the disc. In this respect, the remaining track may be termed the "least significant digit" track.

Figure 15:
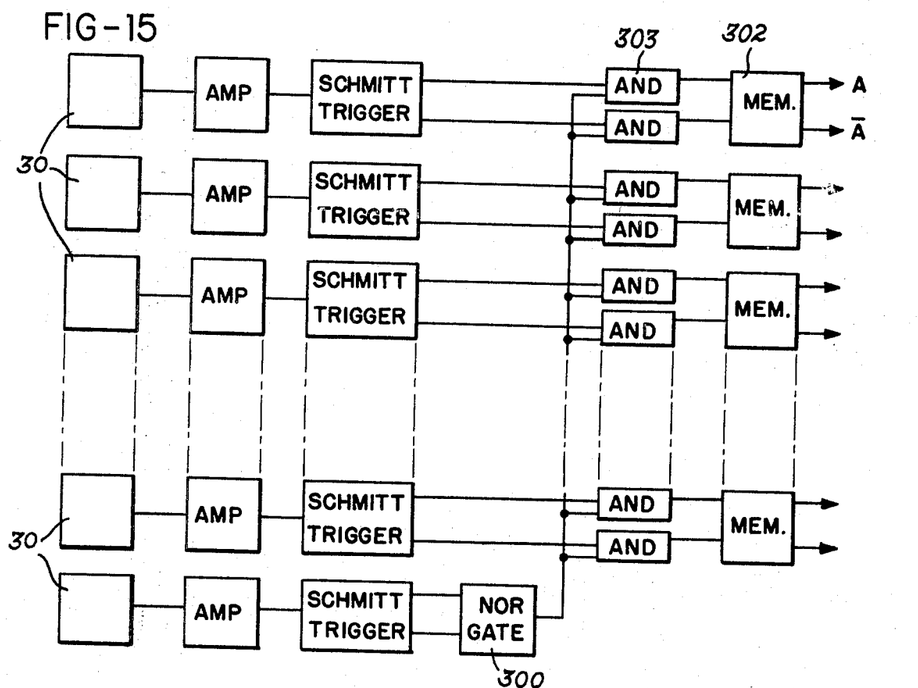
FIG. 15 is a block diagram of one embodiment of the electrical apparatus wherein an unambiguous readout is obtainable from an optically encoded member.

The output of the Schmitt trigger driven from the photomultiplier reading the "least significant digit" track is fed through a RC high-pass filter to produce pulses which are then in turn fed to the transistorized NOR gate 300, and thus this gate produces a negative going pulse regardless of whether the track being read is changing from clear to opaque or from opaque to clear. FIG. 15 shows also a suitable readout circuit employing R-S memory circuits having inputs from AND gate circuits, these being indicated generally at 302 and 303 respectively. There are two of these AND gate circuits for each of the R-S memory elements corresponding to the number of tracks on which code information appears. The second input to each of these AND gates is driven by the respective anode of a corresponding Schmitt trigger, thus each Schmitt trigger circuit will establish a level on one side or the other of each of the memory circuits such that when a pulse is generated by the NOR gate 300, the respective memory circuit will be set into a state corresponding to the condition of its Schmitt trigger at the time of the pulse. Thus, the output of the disc code exists at all times in the memory elements, and regardless of how many tracks actually change their state at any given time, the information of each track is simultaneously placed into the memory circuits. In this way an unambiguous readout is obtained from the disc.

Figure 16:
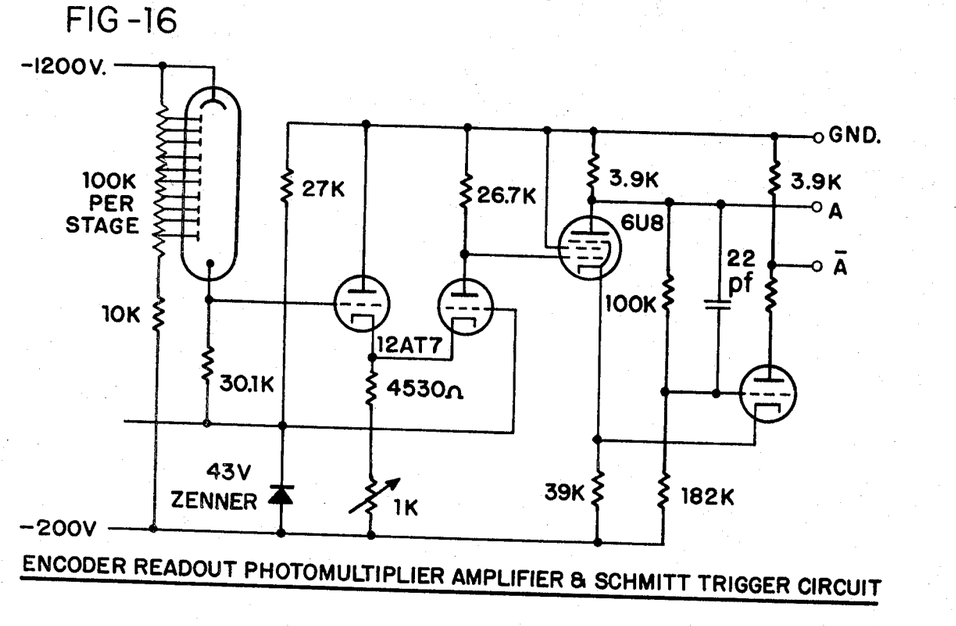
FIG. 16 is a schematic diagram of an encoder readout photomultiplier and Schmitt trigger circuit.
Figure 17:
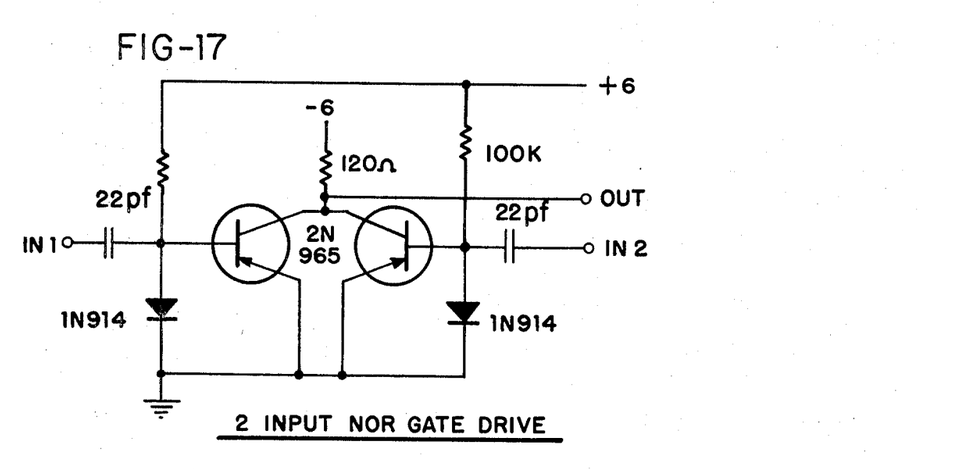
FIG. 17 is a schematic diagram of a two input NOR gate drive circuit.
Figure 18:
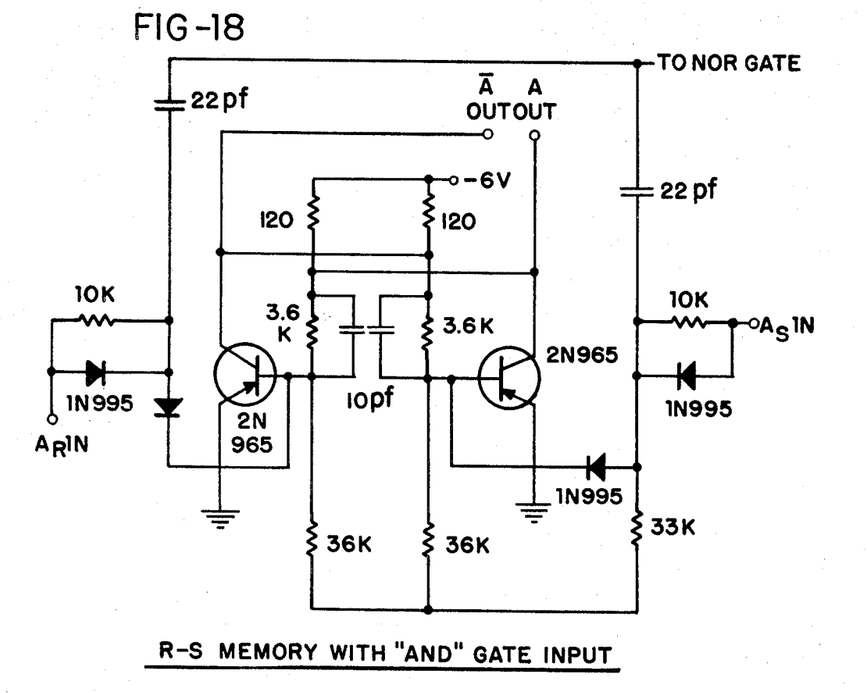
FIG. 18 is a schematic diagram of a R-S memory with an AND gate input.

FIG. 16 is a circuit diagram showing a suitable form of readout photomultiplier amplifier and Schmitt trigger circuit. FIG. 17 shows the details of a typical NOR gate circuit, such as circuit 300 shown in FIG. 15. Finally, FIG. 18 shows a schematic diagram of a suitable R-S memory circuit together with the AND gate circuit whereby outputs may be obtained selectively from each track for either direct or complementary readout. The direct readout in FIG. 18 is labeled A "out" and the complementary readout is labeled $\bar{A}$ "out."

While the forms of apparatus herein described constitute preferred embodiments of the invention, it is to be understood that the invention is not limited to these precise forms of apparatus, and that changes may be made therein without departing from the scope of the invention which is defined in the appended claims.

I claim:

1. An apparatus for converting into electrical signals the digital information stored on a cyclically movable member, said information being optically encoded in discrete separate tracks grouped into bands, said apparatus comprising light source means for each of said bands for directing light onto said member to illuminate a plurality of said discrete separate tracks within their respective band, optical means for magnifying and separating the image of the illuminated discrete tracks from each of said bands, means for receiving the magnified and separated image including a fiber optic means for each of the illuminated tracks of each of said bands, said fiber optic means further separating the light from said discrete tracks in said separate bands while transmitting the light received to a remote location without appreciable loss of the intensity of the light applied thereto, photoelectric transducers for each of said tracks, means terminating said fiber optic means from corresponding tracks in separate bands at a common photoelectric transducer for activating said transducer thereby to produce electrical signals in response to the information carried by said encoded member, and optical shutter means located in the light path of each of said bands to select the band to be read out.